Jan. 29, 1929.
S. MADSEN
1,700,683
DOUBLE END UNIVERSAL SAW
Filed Oct. 3, 1927
5 Sheets-Sheet 1
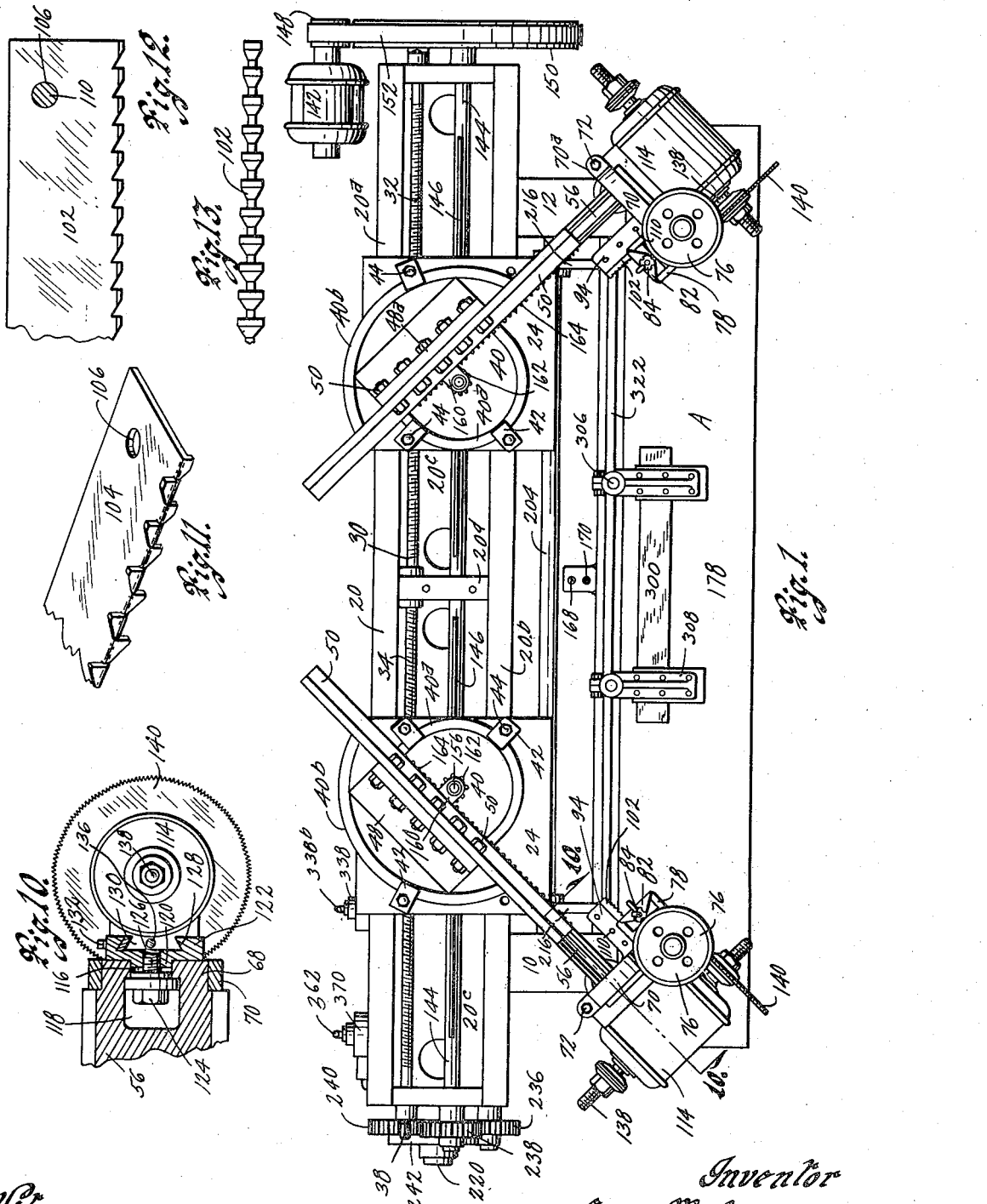
Witness
L. F. Sandberg
Inventor
Sern Madsen
by Barr & Freeman Attorneys Jan. 29, 1929.
S. MADSEN
1,700,683
DOUBLE END UNIVERSAL SAW
Filed Oct. 3, 1927
5 Sheets-Sheet 2
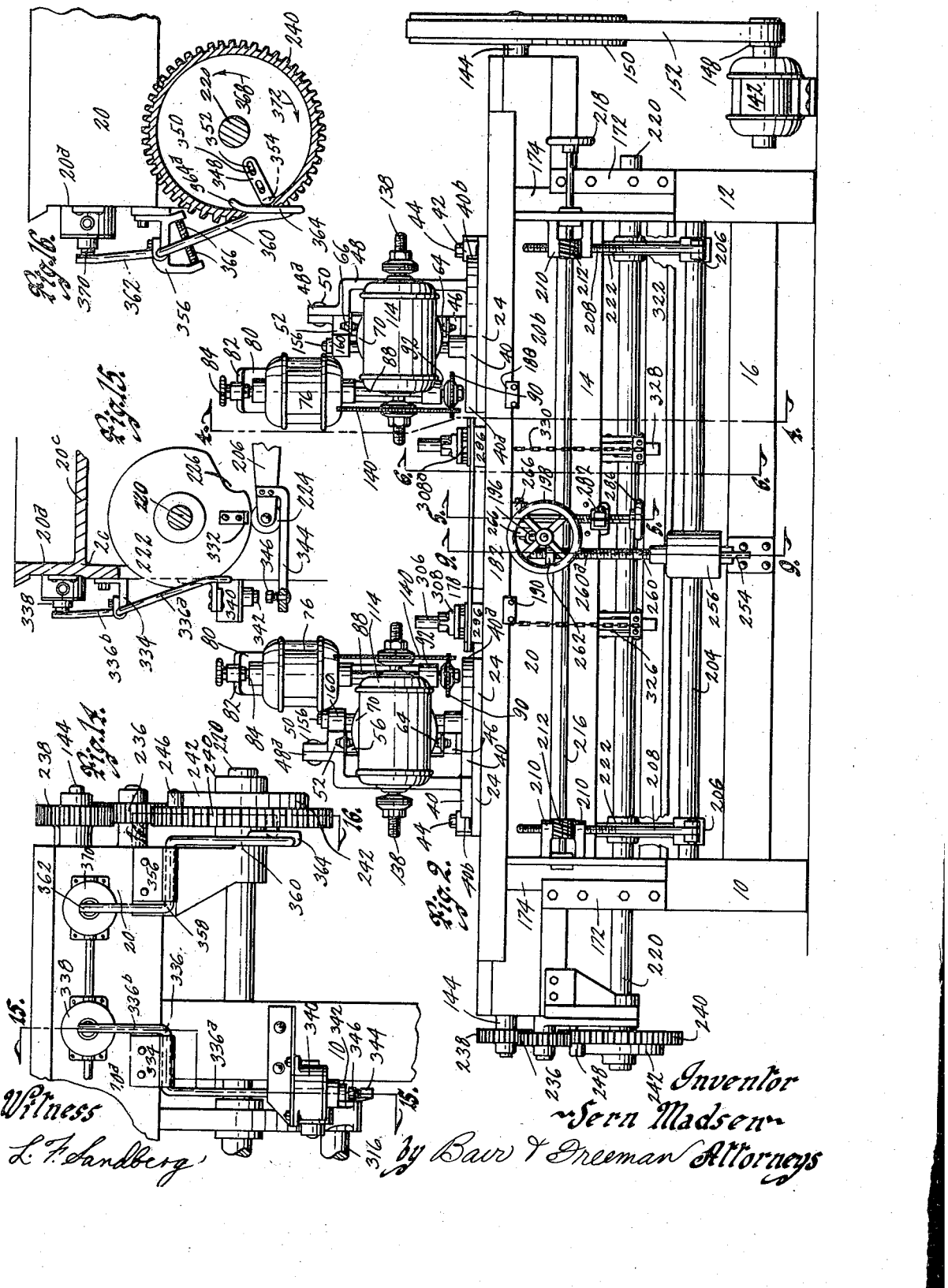

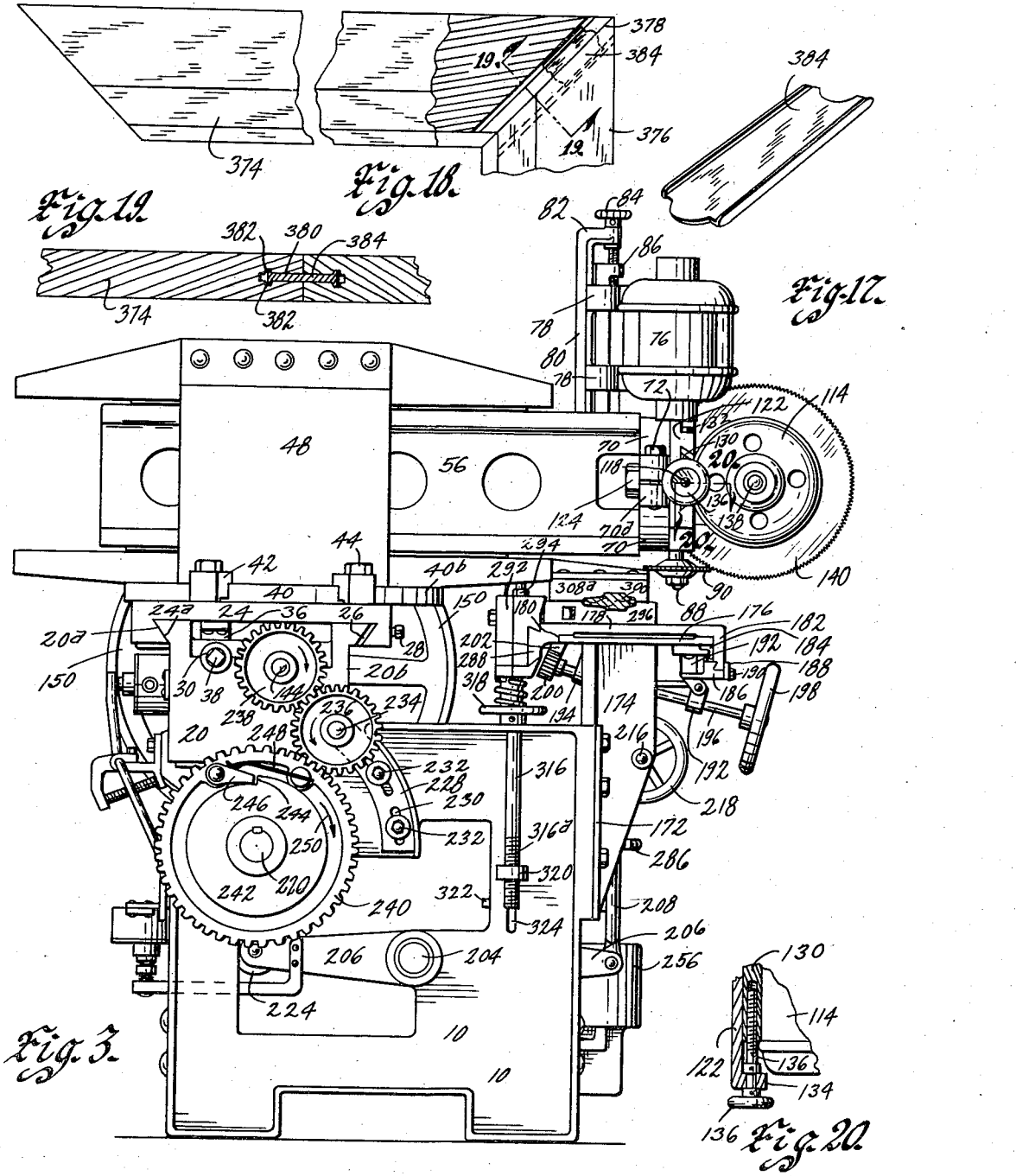

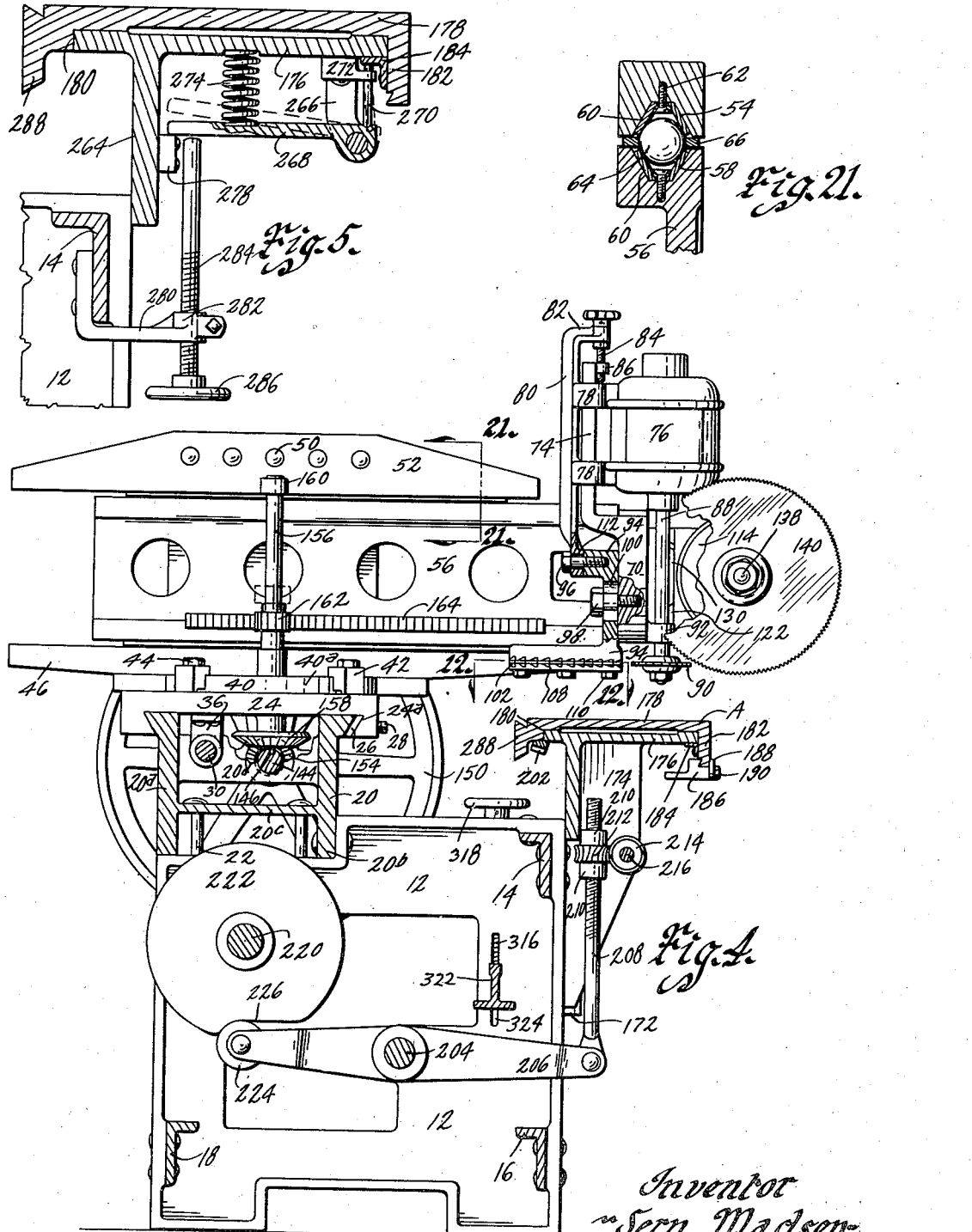

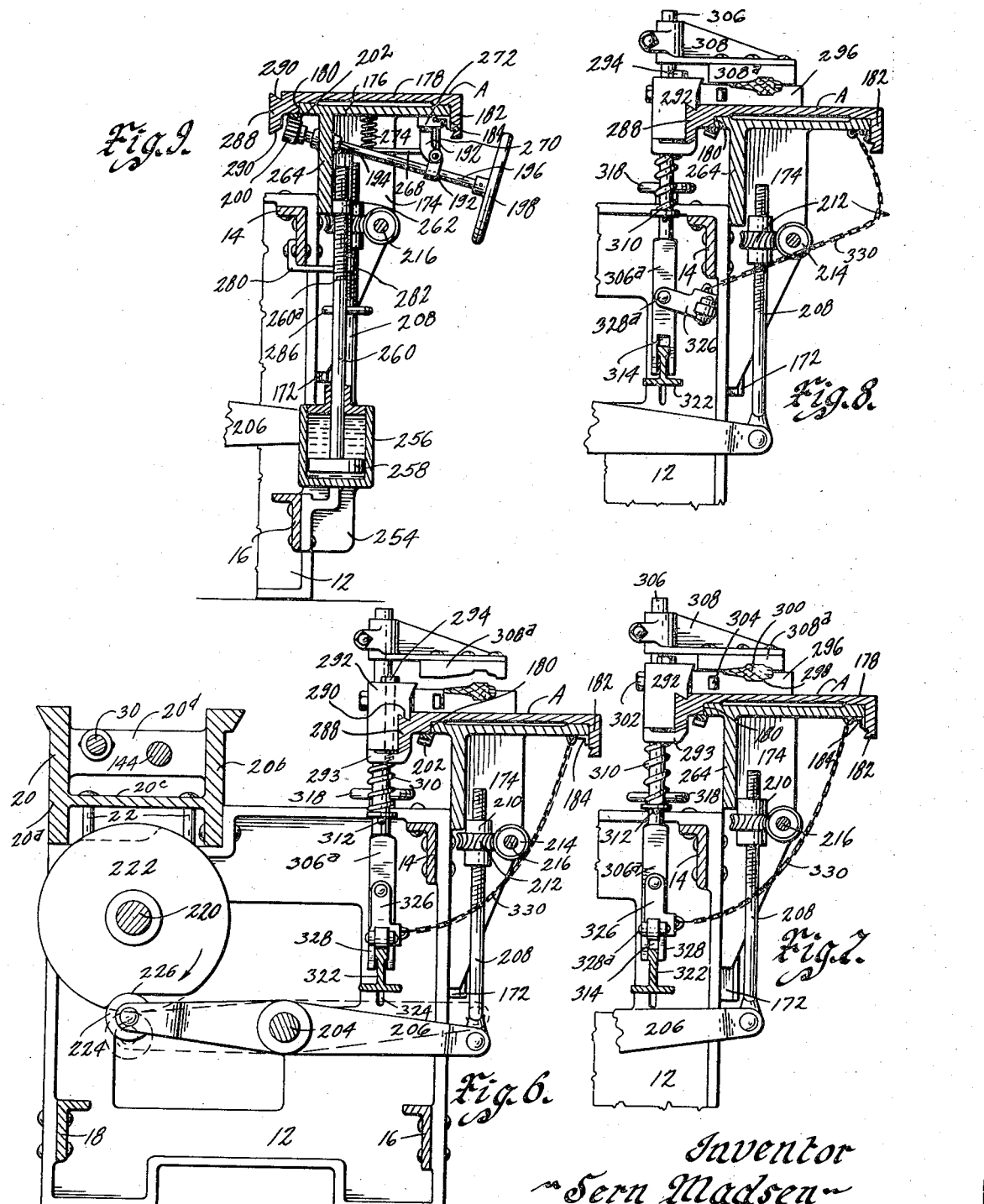

Patented Jan. 29, 1929.

1,700,683

UNITED STATES PATENT OFFICE.

SERN MADSEN, OF CLINTON, IOWA, ASSIGNOR TO CURTIS COMPANIES, INCORPORATED, OF CLINTON, IOWA.

DOUBLE-END UNIVERSAL SAW.

Application filed October 3, 1927. Serial No. 223,620.

The object of my invention is to provide a double end universal saw capable of performing a great variety of operations on wood stock, such as is used in the making of window frames, sashes, doors and the like.

More particularly, it is my object to provide a double end universal saw of the kind having a frameway with a pair of saddles mounted thereon for lateral adjustment in the machine. Supported on each saddle for rotary adjustment is a frame, which carries guideways for a ram. The ram is longitudinally adjustable and carries motors, saws and other cutting tools for providing a variety of saw cutting and broaching operations.

It is my purpose to provide such a device in which the saws and cutting tools can be adjusted to a great variety of positions for performing different operations on the stock.

In providing such a machine, it is my purpose to provide means whereby both ends of the stock can be worked on at once or independently, whereby either end of the stock may be cut at different angles in a horizontal plane and at different angles from the vertical, and at different combinations of angles, and in which the two ends of the stock may be cut differently or alike as may be desired.

Still a further object is to provide in such a machine a novel work table on which the work can be clamped and to provide means for automatically clamping and releasing the work and also means for automatically clamping the table after the end adjustment thereof.

It is my object to provide such a machine which moves stock out of the path of the cutting tools after an operation has been performed.

Another object is to provide such a device in which means are provided for preventing the performance of a second cycle until the operator has inserted new stock, which will then perform a complete cycle of operations when the machine is started.

It is my purpose in this connection to provide a machine which will cut miter joint ends with kerfs broached at their bottoms for the reception of miter joint keys.

A further object is to provide such a machine in which stock that is too short to be cut at both ends at once can be secured to the table and cut at one end after which the table can be moved and during another cycle of operations the other end of the stock can be operated upon with accuracy.

Although the invention is susceptible of a variety of embodiments, it is unnecessary to fully describe and illustrate more than one in order to give a full understanding of the invention both from its structural and functional standpoints.

With these and other objects in view, my invention consists in the construction, arrangement and combination of the various parts of my double end universal saw, whereby the objects contemplated are attained, as hereinafter more fully set forth, pointed out in my claims, and illustrated in the accompanying drawings, in which:

Figure 1 is a top or plan view of a double end universal saw embodying my invention.

Figure 2 is a front elevation of the same.

Figure 3 is a right end elevation of the machine.

Figure 4 is a detail, sectional view taken on the line 4—4 of Figure 2.

Figure 5 is a detail, sectional view taken on the line 5—5 of Figure 2.

Figure 6 is a detail, sectional view taken on the line 6—6 of Figure 2.

Figures 7 and 8 are sectional views taken on the same line as Figure 6, fewer parts being shown and the parts being shown in different positions for illustrating the operation of the machine.

Figure 9 is a detail, sectional view taken on the line 9—9 of Figure 2.

Figure 10 is a detail, sectional view taken on the line 10—10 of Figure 1.

Figure 11 is a perspective view of one of the broaching tools.

Figure 12 is a horizontal, sectional view taken on the line 12—12 of Figure 4.

Figure 13 is a front elevation of the broaching tool shown in Figure 12.

Figure 14 is a rear elevation of one end of the machine.

Figure 15 is a detail, sectional view taken on the line 15—15 of Figure 14.

Figure 16 is a detail, sectional view taken on the line 16—16 of Figure 14.

Figure 17 is a perspective view of a miter joint key.

Figure 18 is a plan view of a portion of a door, parts being shown in section and parts broken away for illustrating cuts made by my machine.

Figure 19 is a detail, sectional view taken on the line 19—19 of Figure 18.

Figure 20 is a detail, sectional view taken on the line 20—20 of Figure 3; and

Figure 21 is a detail, sectional view taken on the line 21—21 of Figure 4.

*Frame.*

My improved machine has a supporting frame composed of spaced end members indicated in the accompanying drawings by the reference numerals 10 and 12. These frame members 10 and 12 are connected at the front of the machine by upper and lower horizontal frame members 14 and 16 and at the lower rear part of the machine by the horizontal frame member 18. (Figure 6.)

*Mounting for cutting tools.*

The upper rear part of the machine is connected by and supports a frameway indicated generally at 20, having the laterally extending members 20ª and 20ᵇ, the connecting members 20ᶜ between the members 20ª and 20ᵇ and the connecting cross members 20ᵈ. (Figures 1 and 6.)

The members 20ᶜ are bolted to the end members 10 and 12 as at 22. (Figure 6.)

Slidably mounted on the frameway 20 are spaced saddles 24 shown for instance in Figure 4. The saddles 24 are provided with the usual gibways 24ª in one of which is a bar 26. The saddles are locked on the frameway 20 by means of set screws 28.

For adjusting the saddles 24 longitudinally on the machine, I provide the following means:

Rotatably but non-slidably mounted in the members 20ᵈ is a rod or shaft 30, the opposite ends of which are provided with right and left-hand screw threads 32 and 34 respectively.

Extending downwardly from each saddle 24 is a bracket 36 having a threaded connection with the rod 30. One end of the rod 30 is squared as shown for instance at 38 in Figure 3 to receive a suitable crank handle or the like for imparting rotation to said rod and thus simultaneously adjusting the saddles 24 toward or from each other.

On each saddle is mounted a base 40 for rotary adjustment. (See Figure 3.)

As shown for instance in Figure 1, the base 40 has curved edges 40ª and 40ᵇ, which are engaged by clamp blocks 42. Through the clamp blocks 42 extend suitable bolts 44 screwed into the saddles 24.

By loosening the bolts 44, the bases 40 can be rotated to any desired position and then locked by tightening the screw bolts.

On each base 40 is a lower guideway 46 shown for instance in Figure 2, and an upwardly projecting bracket 48 shown in that figure and in Figure 3. The bracket 48 has at its upper end an offset portion 48ª to which is bolted as at 50 an upper guideway 52.

The guideways 46 and 52 are provided with V-shaped grooves 54, perhaps best illustrated in Figure 21.

Sliding between the guideways 46 and 52 are rams 56. The rams 56 are provided with the coacting registering V-shaped guideways 58, as shown for instance in Figure 21.

In the V-shaped grooves 46, 52 and 58 are channel-shaped liners 60 with inclined walls as shown in Figure 21, which are held in place by means of screw bolts 62.

Interposed between the rams 56 and the respective guideways are balls 64 received in holes in suitable spacer bars 66.

There is thus provided appropriate means for sliding the rams on the bases 40 with a minimum of friction.

The means for sliding the rams will be hereinafter described in connection with the description of the operative mechanism of the machine.

At what may be called the forward end of each ram, I provide means for mounting two motors and a broaching tool.

At its forward end, each ram is provided with a narrow cylindrical head 68. Rotatably mounted on the head 68 is a clamp 70 having the ears 70ª (see Figures 1, 3, 4 and 10), which may be adjustably locked together by means of a screw bolt 72.

By loosening the screw bolt 72, the clamp 70 may be adjusted around the ram's head for thus adjusting the position of the cutting tools and motors around the horizontal axis of the ram.

The clamp or split collar 70 has a projecting arm 74 shown in Figure 4.

The motor 76 is slidably mounted on the arm 74 by means of a pair of yokes 78. A bracket member 80 connects the yokes 78 and has an offset portion 82 at one end, in which is rotatably but non-slidably mounted an adjusting screw 84, which is threaded through a lug 86 on the arm 74.

By adjusting the screw 84, the motor 76 may be adjusted on the arm 74.

The shaft 88 of the motor 76 projects downwardly and may carry a variety of tools, such for instance as the kerfing saw 90.

The lower end of the shaft 88 may be journaled in the bearings 92 connected with the clamp 70. A bracket member 94 may be formed integrally with the bracket 80 or may be connected therewith by a screw bolt 96.

The bracket member 94 is mounted on the clamp yoke 70 for vertical adjustment by means of a screw bolt 98, which is screwed into the yoke 70 and extends through a slot 100 in said bracket member 94. (See Figure 4.)

A suitable broaching tool 102, such as is shown in Figures 12 and 13 or a broaching tool 104, such as is shown in Figure 11, may be secured to the bracket member 94. The broaching tools have in their shanks the holes 106. The shanks of the broaching tool are placed against the bracket 94 and a plate 108 is then placed against the opposite side of the shank and screw bolts 110 (see Figure 4) are extended through the plate 108 and the holes 106 and screwed into the bracket 94.

It will be seen that the motor 76 carrying the kerfing saw 90 and the bracket 94 carrying the broaching tool 102 are simultaneously adjustable on the arm 74.

For allowing slight adjustment of the bracket 94 with relation to the motor 76 and its shaft 88 and the saw 90 carried thereby, I preferably provide the bracket 80 with a slightly elongated slot 112 for receiving the screw 96.

By loosening the screw 96, the bracket 80 may be adjusted somewhat with relation to the bracket 94. The screw 96 may then be tightened for locking the parts in their position as adjusted.

It will thus be seen that the clamp or collar 70 is rotatably adjusted on the ram head and that the motor 76 and bracket 94 are also adjustable on the arm 74.

There is also mounted on each ram 56 a motor 114. The manner of mounting this motor on the ram is shown in Figures 3, 10 and 20.

Extending through the cylindrical head 68 lengthwise of the ram is a hole 116. The web of the ram is cut away to form an opening 118 adjacent to the hole 116. The hole 116 is round and the cylindrical base 120 of a saddle 122 is rotatably projected into the hole 116, as shown in Figure 10.

Received in the opening 118 is a shoulder head 124 of a screw bolt 126, which screws into the saddle 122. By tightening the screw bolt 126, the saddle 122 may be locked in any position of its rotary adjustment on a horizontal axis.

The saddle 122 is provided with the usual gibways 128 in which the base 130 of the motor 114 is slidably mounted. The base 130 may be locked in the saddle 122 by means of set screws 132. (Figure 10.)

For slidably adjusting the motor 114 in the saddle 122, I have provided the following means:

The saddle 122 as shown in Figure 20 is provided with a projecting offset arm 134 in which is rotatably but non-slidably mounted an adjusting screw 136, the threaded end of which is screwed into the base 130 of the motor 114.

By loosening the set screws 132 and rotating the screw 136, the motor 114 may be adjusted slidably with relation to the saddle 122 and the set screws 132 may then be tightened for locking the parts in their adjusted positions. The motor 114 has the shaft 138 on which may be mounted a saw 140 or other cutting tools. (See Figures 1 and 10.)

*Frame adjusting means.*

Suitably mounted on my machine or in proper relation thereto is an operating motor 142, shown in Figure 1.

Extending from side to side in the machine and journaled in suitable bearings is a shaft 144 having keyways 146.

On the shaft of the motor 142 is a pulley 148 and on the shaft 144 is a pulley 150. A belt 152 travels on these pulleys for transmitting rotation from the shaft of the motor 142 to the shaft 140.

On the shaft 144, beveled pinions 154, such for instance as are shown in Figure 4, are keyed for slidable movement and to rotate with the shaft.

Journaled in each saddle 24 and extending upwardly through the vertical axis of each base 40 is a shaft 156 on the lower end of which is a beveled gear 158 meshing with one of the beveled pinions 154.

The shaft 144 is rotatably journaled in the members 20$^d$ of the frameway 20 as illustrated for instance in Figure 6.

The upper end of each shaft 156 is journaled as at 160 on the upper guideway 52. On the shaft 156 is a pinion 162, which meshes with the rack 164 on the ram 56. The pinion 162 is keyed on the shaft 156 for sliding but non-rotary movement. The pinion 162 can be slid upwardly and turned with relation to the key 166, so it will rest on the key and not drop into mesh with the rack 164, when it is desired to slide the ram 56 by hand for cut-off operations.

Starting and stopping switches 168 and 170, as shown in Figure 1, are provided for controlling the motor 142.

At the front of the machine, I provide a work table indicated generally at A, which may be controlled simultaneously and synchronously with the cutting tools.

*Work table.*

At the front of the machine are spaced vertical guides 172 (see Figures 2 and 3) in which slide upright brackets 174. These upright brackets 174 are connected by and support at their upper ends a work table support 176.

Slidably supported on the work table support 176 is the work table proper 178, having a shoulder 180 and a flange 182 engaging the side edges of the support 176.

Extending inwardly from the flange 182 is an angle iron bracket 184, which projects under the support 176, preventing any upward tilting of the table 178 on the support 176.

Slidably mounted in the lower edge of the flange 182 is a pair of stop members, each comprising a clamp formed of the members 186 and 188 gripped together by means of a bolt 190. These stop members may be adjusted to different positions for any suitable purpose and particularly for the purpose hereinafter set forth.

For adjusting the work table 178 on the support 176, I have provided the following means:

Extending downwardly from the support 176 is a bracket 192 and a flange 194. (See Figure 9.) Journaled in the members 192 and 194 is a shaft 196 on the outer end of which is a hand wheel 198.

On the inner end of the shaft 196, as shown in Figure 3, is a pinion 200, which meshes with a rack bar 202 fastened on the under side of a projecting portion of the table 178.

For raising and lowering the work table A, suitable provision has been made.

Mounted on the lower part of the main frame of the machine is a shaft 204 on which levers 206 are mounted about midway between their ends.

Pivoted to the forwardly extending end of each lever 206 is an upwardly extended threaded rod 208. The upper ends of the rods 208 are loosely journaled in bosses 210 supported on the respective brackets 174.

For allowing some adjustment of the work table A relative to the rods 208, there is mounted on each rod 208 between its bearings 210 a worm gear 212, which meshes with a worm 214 on a shaft 216 journaled in the brackets 174 transversely of the machine.

The rod or shaft 216 is provided at its end with a hand wheel 218. (Figure 5.)

A shaft 220 is mounted on the main frame of the machine substantially below the shaft 144 as shown in Figure 4. On the shaft 220 are cams 222, which coact with rollers 224 on the rear ends of the levers 206.

The cams 222 have the notches 226, so that when the rollers are in said notches, the table A will drop by gravity to its lowered position, whereas when the rollers 224 are out of the notches 226, the table will be raised.

Mounted at the left-hand end of the machine is a bracket 228 (see Figure 3) having slots 230 curved on the arc of a circle, having its center at the center of the shaft 220. The bracket 228 is adjustably mounted on the frame member 10 for adjustment around the shaft 220 for a limited distance by means of screw bolts 232, which extend through the slots 230 and into the frame member 10.

Projecting from the bracket 228 is an idler shaft 234 on which is a pinion 236, which meshes with a pinion 238 on the shaft 144 and with a gear 240 on the shaft 220.

The bracket 228 is made adjustable so that the pinion 238 may be removed and pinions of different sizes substituted.

When this is done, the adjustment of the bracket 228 makes it possible to secure proper meshing of the pinions. The use of different sizes of pinions 238 is for the purpose of varying the stroke of the ram 56, which it will be remembered is actuated from the shaft 144, by means of the pinions 154 and 158, the shafts 156, the pinions 162 racks 164. (See Figures 3 and 4.)

The gear 240 is rotatably but non-slidably mounted on the shaft 220. Fixed on the shaft 220 adjacent to the gear 240 is a disc 242, having one notch 244. Pivoted to the pinion 240 is a pawl 246 which is yieldingly held against the disc 242 by means of a spring 248 on the gear 240.

It will thus be seen that when the gear 240 is moved in the direction indicated by the arrow 250 in Figure 3, the pawl 246 will engage the ratchet 242 and rotate it for rotating the shaft 220. (Figure 3.)

The cams 222 shown for instance in Figure 4 are thus rotated for actuating the levers 206 and raising the table A.

On the other hand, when the gear 240 is rotated in the opposite direction, the pawl 246 will simply drag around the disc 242 and will not cause any movement of that disc or the shaft 220.

Thus when the rams are in their rearward position of movement, and the table is in its lowered position and the machine is started, the rotation of the shaft 144 will advance the rams 56 in the machine through the mechanism shown in Figure 4.

At the same time through the pinion 236, the gear 240 will be rotated carrying with it the pawl 246 and disc 242 for rotating the shaft 220 and rotating the cams 222 (see Figures 3 and 4) for operating the levers 206 and connected parts for raising the table.

The parts are so synchronized that the forward stroke of the ram occurs during a time when the shaft 220 is making one full revolution.

Thus at the end of such revolution, the rollers 224 again enter the notches 226 and the table A is permitted to lower. The table A lowers by gravity.

For cushioning its lowering movement, I provide a dash pot structure shown in Figures 2, 3 and 9.

On the frame member 16 is a bracket 254, which supports a dash pot cylinder 256 in which the plunger 258 loosely slides. The plunger 258 has a stem 260 slidably extended through the upper part of the dash pot cylinder and screw-threaded at its upper end as at 260$^a$ and threaded into a journal 262 on the downwardly extending flange 264 of the support 176.

By rotating the rod 260, the position of the piston with relation to the dash pot and the table may be varied somewhat.

It will be understood that the height of the dash pot cylinder 256 is such as to allow for more than the ordinary up and down movement of the table.

For locking the table 178 to the support 176 against accidental lateral adjustment in the machine, when the table is in any except its lowermost position, I provide the following means: (Figure 5.)

On the under side of the support 176 is mounted a yoke 266 to which is pivoted a lever 268. A pin or rod 270 is pivoted to the forward end of the lever 268 and is loosely, slidably extended through a bracket 272 on the under side of the support 176 in such manner as to engage the bracket 184 on the flange 182.

A spring 274 interposed between the support 176 and lever 268 normally holds the pin 270 in position for engaging the bracket 184 for locking the table 178 and support 176 together.

A stop 278 on the flange 264 limits the downward movement of the lever 268.

Supported on the frame member 14 is a bracket 280 which has a threaded bearing 282 receiving a threaded rod 284 with a hand wheel 286 on its lower end. The rod 284 stands just below the rear end of the lever 268 and is adjusted so that the lever 268 strikes the rod 284 when the table has almost reached its lower position, so that when the table is in its lower position, the lever 268 will be raised, so that the table 178 and support 176 will not be locked together.

The table can then be easily adjusted endwise on the support 176.

The endwise movement of the table is limited by the stops 186, which strike the bracket 192. (See Figure 3.)

Work holder.

Referring to Figures 6, 7, 8 and 9, it will be seen that I have provided a work holder for holding stock on the table A (or 178).

At the rear part of the table 178 is provided a portion 288 provided with gibways 290. Clamp devices comprising the members 292 and 293 have parts for entering and engaging the gibways. The clamp devices 292 and 293 are fastened together by means of screw bolts 294 extended for instance through the member 290 and screwed into the member 293.

A work holding member 296 is placed on the table 178. The member 296 may be provided with a face 298 of suitable contour to snugly receive the stock 300. A screw bolt 302 is extended horizontally through the member 292 and into a hole in the member 296, and is screwed into a nut 304 inset in the member 296, as shown for instance in Figure 7.

Thus different kinds of members 296 may be locked to the member 292.

Slidably mounted in the members 292 and 293 in each instance is an upright shaft 306 on the upper end of which is clamped an upper work engaging member 308.

A spring 310 on the shaft or rod 306 engages the member 293 and a pin 312 is mounted in the rod 306 for normally, yieldingly holding the rod 306 and the work engaging member 308 in lowered position.

It will, of course, be understood that two or more of these work holding devices are ordinarily provided.

The lower part of the rod 306 is squared as at 306$^a$ and is provided with a slot 314. (See Figure 8.)

Referring now to Figure 3, it will be noted that there is journaled on the frame member 10 a vertical rod 316, having a hand wheel 318 at its upper end. The lower end of the rod 316 is threaded as at 316$^a$ and is extended through a threaded member 320.

The member 320 is connected with a member 322, which is slidably mounted in a vertical slot 324 in the frame member 10. (See Figures 3 and 7.)

The member 322 is designed to project into the slot 314. Pivoted to the portion 306$^a$ of the rod 306 substantially above the slot 314 is a link 326 carrying rollers 328 which normally bear upon the upper face of the bar member 322 as shown in Figure 6.

These parts are so arranged that on the downward movement of the table A when the table almost reaches its lowermost position, the rollers 328 in the member 326 will engage the member 322 and the shaft 306 will be forced upwardly against the tension of the spring 310 for lifting the work engaging member 308 away from the stock 300.

Except when the table is at its lowermost position, the stock will be gripped between the members 296 and 308.

If it is desired to keep the stock gripped between the holding members, the link 326 carrying the roller 328 is swung upwardly on its pivot 36$^a$ to the position shown for instance in Figure 8, whereupon the work releasing means will be inoperative, and the work will remain gripped and held until the member 326 is allowed to drop to vertical position.

A chain or the like 330 may be connected with the member 326 for conveniently drawing it to inoperative position.

It may be mentioned that the work holder 308 carries a block or the like 308$^a$, which is detachably secured to the member 308 and may be of such configuration as to fit the stock 300.

Automatic switch operating mechanism.

It will be remembered that the machine is started by a manually actuated switch.

The operation of the machine will be referred to in detail later in this description, but it may be here mentioned that when the starting switch 168 is actuated, the parts are operated for advancing the rams for the cutting operation.

It will be understood that the table is automatically raised.

At the close of the cutting operation, the motor circuit is opened in the following manner:

Referring to Figures 14 and 15, it will be noted that on one of the cams 222 is mounted a projecting finger 332. Journaled in a bracket 334 on the frameway 20 is a shaft 336, having a downwardly extending arm 336$^a$ and an upwardly extending arm 336$^b$. The downwardly extending arm 336$^a$ is so arranged as to be engaged by the finger 332, after the cutting operation has been completed at the forward part of the movement of the ram and just before the cams 222 have completed one revolution.

The shaft 336 is thus operated for causing the upwardly extending arm 336$^b$ to engage and actuate the switch 338. This opens the motor circuit and applies the magnetic brake, which is of the usual construction and does not form a part of my present invention.

Means are also provided for closing the motor circuit and reversing the motor.

On the main frame of the machine is a bracket 340 carrying a reversing switch 342.

One of the levers 206 carries an arm 344 on which is a switch engaging member 346.

When the cams 222 have turned a full revolution, the rollers 224 stand below the notches 226. The dash pot heretofore mentioned, however, prevents the immediate dropping of the table and the rocking of the levers 206 until after the switch 338 has been operated.

Then as the table moves downwardly, retarded by the dash pot, the rollers 224 rise into the notches 226 and the member 346 engages and actuates the reversing switch 342.

By this switch, the motor circuit is closed and the motor reversed.

It will be understood that I am now referring to the driving motor 142.

The electrical mechanisms, except the switches and operating parts mentioned, do not themselves form part of my present invention.

When the motor is reversed, the rams are returned to their starting position and means are provided for breaking the motor circuit when the return of the rams is completed.

On the gear 240 is mounted a bar 348. This bar is adjustably mounted by means of screw bolts 350 extended through elongated slots 352 in the bar when screwed into the gear. The bar 348 has a lateral projection 354. (See Figures 14 and 16.)

On the frameway 20 is a bracket 356 to which is journaled a short shaft 358, having a downwardly projecting arm 360 and an upwardly projecting arm 362. On the arm 360 is a laterally extending bar 364, which has a curved upward end 364$^a$, as shown in Figure 16.

A pair of springs 366 engage the opposite sides of the arm 360 for normally holding the arm 362 and the arm 360 in neutral position.

The parts are so arranged that during the advancing stroke of the ram, when the gear 240 turns in the direction indicated by the arrow 368 in Figure 16, the projection 354 will slide over the curved end 364$^a$ and will not operate the switch 370, which is the switch for breaking the motor circuit upon the return of the rams.

On the other hand at the close of the return movement of the rams during which movement the gear 240 turns in the direction indicated by the arrow 372 (Figure 16), the member 354 will engage the bar 364 and swing the arms 360 and 362 for actuating the closing switch 370.

The machine will then be stopped until the starting switch 168 is again actuated.

*Operation.*

I will now describe in somewhat greater detail the operation of my improved double end universal saw.

In Figures 18 and 19, I have shown the members 374 and 376 of a door frame or the like connected by a miter joint 378.

In forming the miter joint, the end of the stock is cut on an angle as shown. A saw kerf 380 is sawed in the stock, and at its inner end the slot thus formed is broached out as at 382 on both sides of the kerf.

These particular cuts are made in order to provide for connecting the parts 374 and 376 at the miter joint by means of miter joint keys 384, such as that shown in Figure 17 and in dotted lines in Figure 18.

Assuming then that it is desired to cut stock like the members 374, to cut the ends on proper angles and to provide the kerfs and perform the broaching operations, the operation of the machine is as follows:

The proper stock holding members 296 and 308$^a$ are connected with the members 292 and 308. (See Figure 7.) The members 326 are left in operative position. The stock 300 to be sawed is laid in position on the members 296.

Referring to Figure 4, the motor 114 is provided with the proper saw 140 for the end cutting operation. On the motor 76 is mounted the kerfing saw 90. On the member 94 is mounted the broaching tool 102 or 104 as may be desired.

The shaft 32 is rotated for adjusting the saddles 24 the proper distance apart laterally in the machine. The bolts 44 (see Figure 1) are loosened and the bases 40 are rotated on the saddles 24 until the rams are arranged to travel in the proper lines, and the bolts 44 are then tightened.

It will be assumed that the proper pinion 238 (Figure 3) has been installed, and that the pinion 238 has been adjusted by adjusting the bracket 228 for securing the proper stroke of the rams.

The table 178 (see Figure 3) is adjusted longitudinally by means of the hand wheel 198 and the connected parts.

The motors 76 and 114 are started and then the starting switch 168 is actuated for closing the circuit through the driving motor 142. That motor through the connecting parts (Figures 1 and 2) imparts rotation to the shaft 144. The rotation of the shaft 144 rotates the shafts 156 (see Figure 4) and through the pinions 162 and racks 164 advances the rams.

During the first part of this advancing movement, the saw cutting operation occurs.

The rotation of the shaft 146 serves to rotate the shaft 220 through the pinions 238, 236 and 240, the pawl 246 and the ratchet disc 242. The rotation of the shaft 220 (Figures 3 and 4) rotates the cam 222 and moves the rollers 224 out of the notches 226 for rocking the levers 206 and raising the rods 208 and carrying with them the table A.

Just after the table A reaches its raised position, the cutting tools reach their operating positions.

The saws 140 cut the beveled ends of the stock. The kerfing saws 90 cut the kerfs 380. (See Figure 19.) The broaching tool 102 broaches the inner ends of the kerfs forming the croaches 382. (Figure 19.)

When the rams reach the forward position of their movement, the cams 222 have made one complete revolution as has, of course, the shaft 220.

Referring to Figure 15, it will be observed that when the shaft 220 and the cams 222 have completed a revolution, the member 332 engages the arm 336$^a$ for rocking the shaft 336 and causing the arm 336$^b$ to actuate the switch 338 for breaking the motor circuit and causing the magnetic brake to stop any further advancing movement of the rams.

Since the rollers 224 are then below the notches 226 (see Figure 6), the table will commence its lowering movement, which is retarded by the dash pot (Figure 9). When the table reaches its lowermost position, the rollers 224 will enter the notches 226 and the member 346 (Figure 16) will actuate the reversing switch 342 for closing the circuit through the motor 142 for reversing the action of the shaft 220 and returning the rams to their starting position.

During the return movement of the rams, the shaft 220 is not rotated, because the pawl 246 (Figure 3) will travel over the ratchet disc 242.

At the finish of the return movement of the rams, the member 354 will engage the member 364 for actuating the arm 362 and operating the stopping switch 370.

When the table moves to its lowermost position, the rollers 328 in the member 326 (see Figure 6) will engage the member 322 and the shaft 306 will be raised for lifting the work engaging member 308$^a$ away from the stock.

The operator may then remove the stock, which has been sawed and replace it with new stock.

These cycles of operations may be repeated as long as that particular kind of stock is being operated upon.

It will be seen that a great many operations may be performed with a machine of this kind.

It will be noted that in the illustrative operation both ends of the stock are operated on at the same time. The ends may be cut on any desired angle by simply rotating the bases 40 on the saddles 24. Different angles may be cut at the two ends of the stock.

By loosening the screw 124, the saddle 122 (Figure 10) may be rotated for causing the saw 140 to cut the beveled edges in a horizontal plane.

Various combinations of these cuts may be secured.

Ordinarily the work is automatically clamped in position and automatically released after being operated on.

If it is desired to keep the work clamped on the table, the member 326 may be swung to inoperative position as shown in Figure 8. This may be desirable when the stock is short, and it is desired to operate on one end during one cycle of operations and then operate on the other end during another cycle.

Ordinarily, the table 178 is automatically clamped to the support 176 by means of the mechanism shown in Figure 5, except when the table is at its lowermost position.

When working on short stock, the operator may between cycles of operation of the machine actuate the hand wheel 198 shown in Figure 3, and move the table laterally in the machine for adjusting it for the operation on the other end, after the first end has been operated upon.

Ordinarily the machine, of course, autocatically releases the work after each cycle of operation.

The mechanism shown in Figure 5 automatically clamps the table 178 to the support 176 after each endwise movement of the table.

The table is automatically lowered for taking the stock out of the path of the cutting tool after a cutting operation, so that work is not roughened by the dragging of the tools on the return stroke of the ram.

The stock is released shortly after the cut, so that it can be removed while the saws are completing their return, and while the table is moving to its lowermost position.

The saws will not start their forward movement until the operator actuates the circuit closing switch 168.

If at any time the operator desires to break the circuit, he can do so by means of the switch 170 (Figure 1).

The work holding means can be adjusted longitudinally on the table by means of the clamp devices 292 and 293 (Figure 7).

Endwise movement of the table can be determined by the stops 186. (Figure 3.)

After the machine has once been started, each cycle of operations is automatically performed.

By changing the saws, various cut-off and tenoning operations can be performed at one cycle.

The upright motors 76 can be easily removed entirely if that is desired for certain kinds of work.

By lifting up the pinions 162 (Figure 4) and letting them rest on the keys 166, the saws 140 can be used for hand cut-off operations.

By using proper saws, dado work can be done.

It will thus be seen that I have provided an automatic machine by which a great variety of operations desirable in a wood working establishment can be performed.

Changes may be made in the details of the construction and arrangement of the parts of my improved machine without departing from the purpose of my invention, and it is my intention to cover by my claims, such modifications in structure or use of mechanical equivalents for the parts shown as may be reasonably included within the scope of my claims.

I claim as my invention:

1. In a device of the class described, a frame, spaced supporting devices mounted thereon for a variety of adjustments, means supported on said supporting devices for cutting wood stock simultaneously at both ends, a work table mounted for vertical reciprocation, and means for actuating said supporting devices and for synchronously raising the work table.

2. In a device of the class described, a frame, spaced supporting devices mounted thereon for a variety of adjustments, means supported on said supporting devices for cutting wood stock simultaneously at both ends, a work table mounted for vertical reciprocation, and means for actuating said supporting devices and for synchronously raising the work table, said table having a slidably mounted top member.

3. In a device of the class described, a frame, a pair of rams mounted thereon for adjustment toward and from each other and for rotary adjustment, means for simultaneously moving the rams toward or from each other, cutters on the rams and means for simultaneously actuating said rams for longitudinal movement, wood working tools on the rams, a work table, and means for automatically moving the table in synchronism with the rams whereby the cutters may simultaneously operate on both ends of stock.

4. In a device of the class described, a frame, a pair of rams mounted thereon, a table mounted for vertical reciprocation, cutting devices carried by said rams, means for automatically actuating said rams for moving the cutting devices for cutting operations, means for synchronously raising the table for bringing stock thereon to cutting position, means for automatically reversing the movement of said rams when they have reached the limit of their first movement, and means for automatically rendering the rams inoperative at the finish of their reversing movement.

5. In a device of the class described, a frame, a pair of rams mounted thereon, a table mounted for vertical reciprocation, cutting devices carried by said rams, means for automatically actuating said rams for moving the cutting devices for cutting operations, means for synchronously raising the table for bringing stock thereon to cutting position, means for automatically reversing the movement of said rams when they have reached the limit of their first movement, and means for automatically rendering the rams inoperative at the finish of their reversing movement, the table actuating means being adapted to permit the table to move to its lower position during the return movement of the rams.

6. In a device of the class described, wood cutting mechanisms, a table mounted for vertical reciprocation, means for actuating said mechanisms for performing operations on stock on the table when the table is in its raised position, means for synchronously raising the table and permitting it to move downwardly, means for automatically gripping stock when the table is above its lower position and adapted to release the stock when the table is at its lower position.

7. In a device of the class described, a frame, a power driven ram slidably mounted thereon, means for mounting the power driven ram for adjustment to different positions laterally of said frame and for rotary adjustment, means for slidably actuating said ram, means for automatically rendering said last means inoperative when the ram reaches one position of its movement, and means for automatically giving the ram reverse movement.

8. In a device of the class described, a frame, a power driven ram slidably mounted thereon, means for mounting the power driven ram for adjustment to different positions laterally of said frame and for rotary adjustment, means for slidably actuating said ram, means for automatically rendering said last means inoperative when the ram reaches one position of its movement, and means on said ram for holding a saw, said means being mounted for sliding adjustment and for rotary adjustment.

9. In a device of the class described, a frame, a power driven ram slidably mounted thereon, means for mounting the power driven ram for adjustment to different positions laterally of said frame and for rotary adjustment, means for slidably actuating said ram, means for automatically rendering said last means inoperative when the ram reaches one position of its movement, means on said ram for holding a saw, said means being mounted for sliding adjustment and for rotary adjustment, and additional cutter holding means on said ram mounted for sliding adjustment.

10. In a device of the class described, a frame, a power driven ram slidably mounted thereon, means for mounting the power driven ram for adjustment to different positions laterally of said frame and for rotary adjustment, means for slidably actuating said ram, means for automatically rendering said last means inoperative when the ram reaches one position of its movement, a saw mounted on said ram for rotary and sliding adjustment, a second saw mounted on said ram for sliding adjustment, and a broaching tool adjustably mounted on said ram.

11. In a device of the class described, a frame, a power driven ram slidably mounted thereon, means for mounting the power driven ram for adjustment to different positions laterally of said frame and for rotary adjustment, means for slidably actuating said ram, means for automatically rendering said last means inoperative when the ram reaches one position of its movement, means for automatically giving the ram reverse movement, and means for adjusting the sliding stroke of the ram.

12. In a machine of the class described, means for cutting the end of a piece of wood stock at various angles, means for simultaneously cutting a saw kerf in such end, and means for broaching out the inner part of the saw kerf.

13. In a device of the class described, a frame, a cutting tool support mounted thereon, means for moving said cutting tool to cutting position and for returning it to starting position, means for synchronously moving work to cutting position and for moving the work out of the path of the return of the cutting tool, and means for automatically clamping stock in position when it is moved to cutting position, and means for automatically rendering said first means inoperative after the return of the cutting tool.

14. In a device of the class described, a frame, a cutting tool support mounted thereon, means for moving said cutting tool to cutting position and for returning it to starting position, means for synchronously moving work to cutting position and for moving the work out of the path of the return of the cutting tools, means for automatically clamping stock in position when it is moved to cutting position and adapted to become inoperative when the work is moved away from cutting position, and means for rendering the releasing means inoperative so that the stock will remain clamped till otherwise released.

15. In a machine of the class described, means for cutting the end of a piece of wood stock at various angles, means for simultaneously cutting a saw kerf in such end, means for broaching out the inner part of the saw kerf, and means for automatically moving stock to position for the cutting, kerfing and broaching operations.

16. In a machine of the class described, means for cutting the end of a piece of wood stock at various angles, means for simultaneously cutting a saw kerf in such end, means for broaching out the inner part of the saw kerf, and means for automatically moving stock to position for the cutting, kerfing and broaching operations and for moving said stock away after such operations.

17. In a device of the class described, a work table, a ram mounted to travel over the table at different angles with relation to the vertical plane of the lengthwise axis of the table, a saw, means for mounting the saw on the ram at different heights and at different angles with relation to vertical, a cutting tool supported on the ram at right angles to the saw, said saw and tool being mounted for simultaneous adjustment to different heights and cutting angles without varying their relative position.

18. In a device of the class described, a work table, a ram mounted to travel over the table at different angles with relation to the vertical plane of the lengthwise axis of the table, a saw, means for mounting the saw on the ram at different heights and at different angles with relation to vertical, a cutting tool supported on the ram at right angles to the saw, said saw and tool being mounted for simultaneous adjustment to different heights and cutting angles, without varying their relative position, and means for varying the relative positions of the saw and tool.

19. In a structure of the class described, a frame, a ram, a ram supporting means rotatably and slidably mounted on said frame, said ram being mounted on the supporting means for slidable movement, a shaft extended through said supporting means in its axis of rotation, gearing devices interposed between said shaft and said ram whereby rotation of the shaft may impart sliding movement to the ram, and tool operating means on the ram.

20. In a structure of the class described, a frame, a ram, a ram supporting means rotatably and slidably mounted on said frame, said ram being mounted on the supporting means for slidable movement, a shaft extended through said supporting means in its axis of rotation, gearing devices interposed between said shaft and said ram whereby rotation of the shaft may impart sliding movement to the ram, tool operating means on the ram, means for operating said shaft in one direction, and means for automatically reversing the direction of rotation of said shaft for returning the ram after it has finished an outward stroke.

Des Moines, Iowa, September 16, 1927.

SERN MADSEN.